United States Patent
Mackulin et al.

(10) Patent No.: US 9,000,069 B1
(45) Date of Patent: *Apr. 7, 2015

(54) SELF-STRATIFYING COATINGS

(75) Inventors: Peter J. Mackulin, North Olmsted, OH (US); Randolph B. Krafcik, Aurora, OH (US); Benjamin M. Borns, Cleveland, OH (US); Jyotindra K. Doshi, North Olmsted, OH (US); Wendy Zhao, Wilmette, IL (US)

(73) Assignee: The Sherwin-Williams Company, Cleveland, OH (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/175,083

(22) Filed: Jul. 1, 2011

Related U.S. Application Data

(60) Provisional application No. 61/361,031, filed on Jul. 2, 2010.

(51) Int. Cl.
*C09D 127/12* (2006.01)
*C09D 133/08* (2006.01)
(Continued)

(52) U.S. Cl.
CPC ............... *C09D 127/12* (2013.01); *C08L 33/10* (2013.01); *C09D 133/08* (2013.01); *C09D 133/10* (2013.01); *C09D 133/16* (2013.01); *C09D 143/04* (2013.01); *C08F 2220/1883* (2013.01); *C08F 20/24* (2013.01); *C08F 220/68* (2013.01);
(Continued)

(58) Field of Classification Search
CPC ......... C08L 27/12; C08L 33/08; C08L 33/10; C08L 51/003; C08L 51/00; C08F 2220/1883; C08F 2220/1891

USPC ............ 524/501, 504, 515, 520; 525/72, 200, 525/245; 523/201
See application file for complete search history.

(56) References Cited

U.S. PATENT DOCUMENTS 3,277,039 A   10/1966   Marascia et al.
4,789,567 A   12/1988   Freeman et al.
(Continued)

FOREIGN PATENT DOCUMENTS

EP   1342509 A2   9/2003
EP   1245596 B1   7/2006
WO   2006107083 A2   10/2006

OTHER PUBLICATIONS

Zhe Liu, Yunhui Zhao, Jianwei Zhou & Xiaoyan Yuan, "Synthesis and Characterization of Core-Shell Polyacrylate Latex Containing Fluorine/Silicone in the Shell and the Self-Stratification Film", Colloid Polymer Science, 2012, p. 203-211, vol. 290, Springer, Tianjin, China.

(Continued)

*Primary Examiner* — Randy Gulakowski
*Assistant Examiner* — Ha Nguyen
(74) *Attorney, Agent, or Firm* — Deron A. Cook; Robert E. McDonald; Eryn Ace Fuhrer

(57) ABSTRACT

The present invention relates to coating compositions formed by combining two latex resins: a base latex resin and a stratifying latex resin. The stratifying latex resin comprises at least one "driver" to promote migration of the stratifying latex to the surface of the coating during curing or drying. Drivers may be selected from one or more of fluorine containing monomers incorporated into the stratifying latex, long chain acrylate monomers, such as lauryl methacrylate, wax, small particle size, or relatively low Tg.

15 Claims, 1 Drawing Sheet

(51) Int. Cl.

| | |
|---|---|
| C09D 133/10 | (2006.01) |
| C09D 133/16 | (2006.01) |
| C09D 143/04 | (2006.01) |
| C08F 220/24 | (2006.01) |
| C08F 220/68 | (2006.01) |
| C08F 20/24 | (2006.01) |
| C08F 20/68 | (2006.01) |
| C08L 27/12 | (2006.01) |
| C08L 33/08 | (2006.01) |
| C08L 33/10 | (2006.01) |
| C08F 220/18 | (2006.01) |

(52) U.S. Cl.
CPC .............. *C08F 20/68* (2013.01); *C08L 27/12* (2013.01); *C08L 33/08* (2013.01)

(56) References Cited

U.S. PATENT DOCUMENTS

| | | | |
|---|---|---|---|
| 4,873,140 A | 10/1989 | McIntyre | |
| 4,908,297 A | 3/1990 | Head et al. | |
| 4,929,666 A | 5/1990 | Schmidt et al. | |
| 5,006,624 A | 4/1991 | Schmidt et al. | |
| 5,093,427 A | 3/1992 | Barber | |
| 5,668,194 A * | 9/1997 | Ando et al. | 523/201 |
| 5,798,406 A * | 8/1998 | Feret et al. | 524/501 |
| 5,898,042 A * | 4/1999 | Sawada et al. | 523/201 |
| 5,962,571 A * | 10/1999 | Overbeek et al. | 524/520 |
| 5,969,030 A * | 10/1999 | Grandhee | 524/457 |
| 6,120,892 A | 9/2000 | Fitzgerald et al. | |
| 6,448,302 B1 | 9/2002 | Dawson et al. | |
| 6,774,164 B2 | 8/2004 | Lyons et al. | |
| 6,790,904 B2 | 9/2004 | White et al. | |
| 6,806,333 B2 * | 10/2004 | Ishida et al. | 526/250 |
| 7,041,727 B2 | 5/2006 | Kubicek et al. | |
| 7,045,571 B2 | 5/2006 | Tan et al. | |
| 7,074,862 B2 | 7/2006 | Kaspar et al. | |
| 7,122,599 B2 | 10/2006 | Haubennestel et al. | |
| 7,125,941 B2 | 10/2006 | Kaulbach et al. | |
| 7,132,489 B2 | 11/2006 | Lee et al. | |
| 7,141,618 B2 | 11/2006 | Schneider et al. | |
| 7,186,772 B2 | 3/2007 | Berkau et al. | |
| 7,196,133 B2 | 3/2007 | Hosoda et al. | |
| 7,247,671 B2 | 7/2007 | Overbeek et al. | |
| 7,396,590 B2 | 7/2008 | Wynne | |
| 2004/0127593 A1 | 7/2004 | Berkau et al. | |
| 2004/0176554 A1 * | 9/2004 | Ishida | 526/242 |
| 2004/0191527 A1 | 9/2004 | Saitoh | |
| 2005/0228080 A1 | 10/2005 | Bilyeu et al. | |
| 2006/0013983 A1 | 1/2006 | Sebastian et al. | |
| 2006/0047095 A1 | 3/2006 | Pacetti | |
| 2006/0141194 A1 | 6/2006 | Carlson et al. | |
| 2006/0167170 A1 | 7/2006 | Hosoda et al. | |
| 2006/0210715 A1 | 9/2006 | Amin-Sanayei et al. | |
| 2006/0223970 A1 | 10/2006 | Roesler et al. | |
| 2006/0235157 A1 | 10/2006 | Kanega et al. | |
| 2006/0264563 A1 | 11/2006 | Hanrahan et al. | |
| 2007/0015866 A1 | 1/2007 | Hintzer et al. | |
| 2007/0032625 A1 | 2/2007 | Roesler et al. | |
| 2007/0053867 A1 | 3/2007 | Ober et al. | |
| 2007/0135567 A1 | 6/2007 | Ruhoff et al. | |
| 2007/0142541 A1 | 6/2007 | Hintzer et al. | |
| 2007/0270534 A1 | 11/2007 | Amin-Sanayei et al. | |
| 2008/0113172 A1 | 5/2008 | Acosta et al. | |

OTHER PUBLICATIONS

Xuejun Cui, Shuangling Zhong, Haitao Zhang, Qiang Qu, Junfeng Li and Hongyan Wang, "Preparation and Characterization of Polytetrafluoroethylene-Polyacrylate Core-Shell Nanoparticles," Polymers for Advanced Technologies, May 8, 2007, 544-548, vol. 18, John Wiley & Sons, Ltd., China.

R.R. Thomas, K.G. Lloyd, K.M. Stika, L.E. Stephans, G.S. Magallanes, V.L. Dimonie, E.D. Sudol and M.S. El-Aasser, "Low Free Energy Surfaces Using Blends of Fluorinated Acrylic Copolymer and Hydrocarbon Acrylic Copolymer Latexes," Macromolecules, Oct. 21, 2000, 8828-8841, vol. 33, American Chemical Society.

W. Ming, M. Tian, R.D. Van De Grampel, F. Melis, X. Jia, J. Loos, and R. Van Der Linde, "Low Surface Energy Polymeric Films from Solventless Liquid Oligoesters and Partially Fluorinated Isocyanates," Macromolecules Jul. 30, 2002, 6920-6929, vol. 35, American Chemical Society.

Su Chen, Weicai Yan and Li Chen, "Compatibility and Morphology of the Fluoropolymer/Polyacrylate Latex Interpenetrating Polymer Networks," Polymer Preprints, 2003, 712, vol. 44(2), Chemical College, Nanjing, China.

A. Toussaint, "Self-stratifying coatings for plastic substrates (Brite Euram Project R1 1B 0246 C(H))," Progress in Organic Coatings, 1996, 183-195, vol. 28, E.L. Sevier, Belgium.

Tosko A. Misev, "Thermodynamic Analysis of Phase Separation in Selfstratifying Coatings—Solubility Parameters Approach," Journal of Coatings Technology, Apr. 1991, No. 795, vol. 63.

C. Carr, "Multilayered Paint Films from Single Coat Systems," The Paint Research Association, 1990, Middlesex, United Kingdom.

Shiyuan Cheng, Yanjun Chen and Zhengguo Chen, "Core-Shell Latex Containing Fluorinated Polymer Rich in Shell," Journal of Applied Polymer Science, 2002, 1147-1153, vol. 85, Wiley Periodicals, Inc., Wuhan, China.

Peter Hupfield, Eiji Kitaura, Tetsuya Masutani, and Masaru Nagato, "Chemical Partners—Synergy between Fluorine and Silicone Enhances Stain Resistance of Coatings.", 8th Nürnberg Congress, Creative Advances in Coatings Technology, Nuremberg, Germany.

Chaocan Zhang and Yanjun Chen, "Investigation of Fluorinated Polyacrylate Latex with Core-Shell Structure," Polymer International, 2005, 1027-1003, vol. 54, Society of Chemical Industry, Wuhan, China.

Jurgen Scheerder, Nico Visscher, Tijs Nabuurs, and Ad Overbeek, Novel, "Water-Based Fluorinated Polymers with Excellent Antigraffiti Properties," JCT Research, Oct. 8, 2005, No. 8, vol. 2.

Vladimir V. Verkholantsev, "Exploiting Self-Stratification.", ECJ, Jan./Feb. 2005.

V.V Verkholantsev, "Heterophase and Self-Stratifying Polymer Coatings," Progress in Organic Coatings, 1995, 31-52, vol. 26, Elsevier Science, Isreal.

Marek W. Urban, "Why Organic Coatings Stratify—Challenges and Opportunities of Locally Varying Coating Properties," ECJ, 2003, pp. 36 & 38, No. 1-2.

V.V. Verkholantsev, "Self-Stratifying Coatings for Industrial Applications," Pigment and Resin Technology, 2003, 300-306, vol. 32—No. 5, Emerald Group Publishing.

Vladimir Verkholantsev, "Self-Stratifying Coatings," Dec. 2000, European Coatings Journal.

V. Verkholantsev and M. Flavian, "Polymer Structure and Properties of Heterophase and Self-Stratifying coatings," Progress in Organic Coatings, 1996, 239-246, vol. 29, E.I. Sevier, Isreal.

V.V. Verkholantsev, "Coatings Based on Polymer/Polymer Composites," Journal of Coatings Technology, Jun. 1992, 51-59, vol. 64 No. 809.

Chris Carr, Sue Benjamin and Derek J. Walbridge, "Fluorinated Resins in Self-Stratifying Coatings," European Coatings Journal, 1995, pp. 262-266, No. 4.

P. Vink and T.L. Bots, "Formulation Parameters Influencing Self-Stratification of Coatings," Progress in Organic Coatings, 1996, 173-181, vol. 28, E.L. Sevier, Netherlands.

D.J. Walbridge, "Self-Stratifying Coatings—an overview of a European Community Research Project," Progress in Organic Coatings, 1996, 155-159, vol. 28, E.L. Sevier, Middlesex, United Kingdom.

A.M. Joly, "Statistical Treatment of Data from the European Community Research on Self-Stratification," Progress in Organic Coatings, 1996, 209-222, vol. 28, E.L. Sevier, Cedex, France.

Yanjun Chen and Hui Zhou, "Effect of Particle Size on Self-Organized Film-Formation of Emulsifier-Free Fluorinated Polyacrylates Latex Blends," Polymer Preprints, 2009, 200, vol. 50(1), The American Chemical Society, Wuhan, China.

(56) References Cited

OTHER PUBLICATIONS

Xiao Xinyan, and Liu Jianfei, "Synthesis and Characterization of Fluorine-Containing Polyacrylate Emulsion with Core-Shell Structure," Chinese Journal of Chemical Engineering, 2008, 626-630, vol. 16(4), Guangzhou, China.

Yang Tingting, Peng Hui, Cheng Shiyuan, and In Jun Park, "Soap-Free Emulsion Copolymerization of Perfluoroalkyl Acrylates in the Presence of a Reactive Surfactant," Journal of Applied Polymer Science, Feb. 27, 2007, 2438-2444, vol. 104, Wiley Periodicals, Inc., Taejon, South Korea.

Jiri George Drobny, "Fluoropolymers in Automotive Applications," Polymers for Advanced Technologies, Nov. 29, 2006, 117-121, vol. 18, John Wiley & Sons, Ltd., New Hampshire, USA.

Pei-Yuan Huang, Yu-Chou Chao, and Yih-Tyan Liao, "Enhancement of the Water Repellency Durability of the Fabrics Treated by Fluorinated Nanocopolymer Emulsions," Institute of Organic and Polymeric Materials, Journal of Applied Polymer Science, Feb. 27, 2007, 2451-2457, vol. 104, Wiley Periodicals, Inc., Taipei, Taiwan.

Yanjun Chen, Shiyuan Cheng, Yifeng Wang, & Chaocan Zhang, "Chemical Components and Properties of Core-Shell Acrylate Latex Containing Fluorine in the Shell and Their Films," Journal of Applied Polymer Science, 2006, 107-114, vol. 99, Wiley Periodicals, Inc., Wuhan, China.

Francesca Signori, Massimo Lazzari, Valter Castelvetro, & Oscar Chiantore, "Copolymers of Isopropenyl Alkyl Ethers and Fluorinated Acrylates, and Fluoracrylates: Influence of Fluorine on Their Thermal, Photochemical, and Hydrolytic Stability," Macromolecules, Feb. 2, 2006, 1749-1758, vol. 39, American Chemical Society.

Yanjun Chen, Chaocan Zhang, & Xinxin Chen, "Emulsifier-Free Latex of Fluorinated Acrylate Copolymer," European Polymer Journal, Oct. 6, 2005, 694-701, vol. 42, E.L. Sevier, Wuhan, China.

Dmitry A. Kulikov, Eugene A. Indeikin, and Vladimir B. Manerov, "Benefits of incompatibility, Layer Separation in Mixed Polymer Systems can Improve Adhesion," European Coatings Journal, 2008, pp. 20-25.

E.I. Dupont De Nemours and Company, DuPont Zonyl Fluoroadditives, Technical Information, Date Unknown.

Tosoh F-Tech, Inc., Fluorester, 2,2,2-Trifluoroethyl Methacrylate, Date Unknown.

Osaka Organic Chemical Industry Ltd., Specialty Monomers, 2) Fluorine-Contained Monomers, Date Unknown.

\* cited by examiner

SELF-STRATIFYING COATINGS

FIELD OF THE INVENTION

The present invention is directed to coating compositions which are self-stratifying or self-layering and a method for forming such coating compositions. Such coatings may be formulated to provide a self-stratifying surface layer, which has desired activity or performance characteristics.

SUMMARY OF THE INVENTION

Coatings according to the present invention comprise a base latex resin and a stratifying latex resin, wherein the stratifying latex is formulated to migrate to the surface of the coating or to form an interfacial layer within the coating film. The stratifying latex may be formulated using one or more "drivers" which promote migration of the stratifying polymer to the surface of the coating or to an interfacial layer within the coating film during curing or drying. In some embodiments, the drivers include, but are not limited to incorporating a fluorinated monomer in the stratifying latex, incorporating a wax as a seed for polymerizing the stratifying latex, incorporating a long chain acrylate monomer having an alkyl length of at least 12 in the stratifying latex, the stratifying latex having a small particle size, and/or the stratifying latex having at least a segment with a relatively low Tg. In some embodiments, monomers having latent crosslinking functionality may be included in the stratifying latex. In such embodiments, a crosslinker capable of reacting with the latent crosslinking functionality may be included in the coating composition.

DETAILED DESCRIPTION OF THE INVENTION

Figure 1:
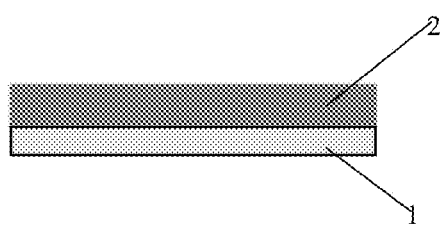
FIG. 1 illustrates a stratified coating having two discrete layers.

The present invention comprises a coating composition including a base latex resin and a stratifying latex resin. Both the base latex and the stratifying latex include polymers polymerized from one or more suitable monomers. Typically, the resins are polymerized from one or more copolymerizable monoethylenically unsaturated monomers, such as, for example, vinyl monomers and/or acrylic monomers.

Vinyl monomers suitable for use in accordance with the polymers of the present invention include any compounds having vinyl functionality, i.e., ethylenic unsaturation, exclusive of compounds having acrylic functionality, e.g., acrylic acid, methacrylic acid, esters of such acids, acrylonitrile and acrylamides. In one embodiment of the invention, the vinyl monomers are selected from vinyl esters, vinyl aromatic hydrocarbons, vinyl aliphatic hydrocarbons, vinyl alkyl ethers and mixtures thereof.

Suitable vinyl monomers also include vinyl esters, such as, for example, vinyl propionate, vinyl laurate, vinyl pivalate, vinyl nonanoate, vinyl decanoate, vinyl neodecanoate, vinyl butyrates, vinyl benzoates, vinyl isopropyl acetates and similar vinyl esters; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

The acrylic monomers suitable for use in accordance with the polymers of the present invention comprise any compounds having acrylic functionality. Acrylic monomers may be selected from the group consisting of alkyl acrylates, alkyl methacrylates, acrylate acids and methacrylate acids as well as aromatic derivatives of acrylic and methacrylic acid, acrylamides and acrylonitrile. In one useful embodiment, the alkyl acrylate and methacrylic monomers (also referred to herein as "alkyl esters of acrylic or methacrylic acid") may have an alkyl ester portion containing from 1 to about 12, for example about 1 to 5, carbon atoms per molecule.

Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, 1-adamatyl methacrylate and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, amino acrylates, methacrylates as well as acrylic acids such as acrylic and methacrylic acid, ethacrylic acid, alpha-chloroacrylic acid, alpha-cycanoacrylic acid, crotonic acid, beta-acryloxy propionic acid, and beta-styryl acrylic acid.

In addition to the specific monomers described above, those skilled in the art will recognize that other monomers such as, for example, allylic monomers, or monomers which impart wet adhesion, e.g., methacrylamidoethyl ethylene urea, can be used in place of, or in addition to, the specifically described monomers in the preparation of the polymers used in the present invention. Further details concerning such other monomers suitable for copolymerization in accordance with the present invention are known to those skilled in the art. The amount of such other monomers is dependent on the particular monomers and their intended function, which amount can be determined by those skilled in the art.

Polymer resins used in the present invention may also comprise acid functional latexes. Specific acid functional monomers suitable for use in accordance with polymers of the present invention include, for example, acrylic acid, methacrylic acid, ethacrylic acid, itaconic acid, maleic acid, dimeric acrylic acid or the anhydrides thereof. Besides carboxylic acids and anhydrides, monomers possessing other acid groups such as sulfonic or phosphoric acid groups are also useful. Representative monomers include ethylmethacrylate-2-sulfonic acid, 2-acrylamido-2-methylpropane sulfonic acid, 2-methyl-2-propenoic acid ethyl-2-phosphate ester (HEMA-phosphate), (1-phenylvinyl)-phosphonic acid, or (2-phenylvinyl)-phosphonic acid. Mixtures of acids are also practical.

Polymers of the present invention may also have crosslinking functionality. At least one of the monomers used to polymerize the latexes herein (either the base latex or the stratifying latex, or both) is a monoethylenically, unsaturated monomer containing "latent crosslinking" capabilities, which as used herein means a monomer which possesses the ability to further react some time after initial formation of the polymer. Activation can occur through the application of energy, e.g., through heat or radiation. Also, drying can activate the crosslinking polymer through changes in pH, oxygen content or other changes that causes a reaction to occur. The particular method of achieving crosslinking in the binder polymer is not critical to the present invention. A variety of chemistries are known in the art to produce crosslinking in latexes.

Representative examples of latent crosslinking carbonyl-containing monomers include acrolein, methacrolein, diacetone acrylamide, diacetone methacrylamide, 2 butanone methacrylate, formyl styrol, diacetone acrylate, diacetone methacrylate, acetonitrile acrylate, acetoacetoxyethyl methacrylate, acetoacetoxyethyl acrylate and vinylaceto acetate. These monomers normally do not affect crosslinking until during final film formation. In some embodiments, the aqueous polymer emulsion may simultaneously contain an appropriate added amount of a reactive material such as a polyamine compound as crosslinker for the latent crosslinking functionality. Particularly suitable compounds of this type are the dihydrazides and trihydrazides of aliphatic and aromatic dicarboxylic acids of 2 to 20 carbon atoms. Polyamine compounds useful as crosslinkers for the carboxyl functional groups include those having an average of at least two carbonyl-reactive groups of the formula —$NH_2$ and carbonyl reactive groups derived from such groups. Examples of useful amine functional groups include R—$NH_2$, R—O—$NH_2$, R—O—N=C<, R—NH—C(=O)—O—$NH_2$, wherein R is alkylene, alicyclic or aryl and may be substituted. Representative useful polyamines include ethylene diamine, isophorone diamine, diethylenetriamine and dibutylenetriamine. In one embodiment of this invention it is useful to utilize polyhydrazides as the polyamine compounds. Representative useful polyhydrazides include oxalic dihydrazide, adipic dihydrazide, succinic dihydrazide, malonic dihydrazide, glutaric dihydrazide, phthalic or terephthalic dihydrazide and itaconic dihydrazide. Additionally, water-soluble hydrazines such as ethylene-1,2-dihydrazine, propylene-1,3-dihydrazine and butylene-1,4-dihydrazine can also be used as one of the crosslinking agents.

Additional building blocks which are suitable for post-crosslinking are those which contain hydrolyzable organosilicon bonds. Examples are the copolymerizable monomers methacryloyloxypropyltrimethoxysilane, methacryloyloxypropyltriethoxysilane methacryloyloxypropyltripropoxysilane, vinyltrimethoxysilane, vinyltriethoxysilane, vinylisopropoxysilane, gamma-amino triethoxy silane, cycloaliphatic epoxide trimethoxy silane, and gamma-methacryloxy propyl trimethoxy silane. In one useful embodiment, such monomers having hydrolysable organosilicon bonds are used for latexes to be used in coatings containing titanium dioxide pigments. The silane functionality of polymers incorporating these monomers are capable of reacting with moisture in the air for the crosslinking reaction.

Epoxy-, hydroxyl- and/or N-alkylol-containing monomers, for example, glycidyl acrylate, N-methylolacrylamide and -methacrylamide and monoesters of dihydric alcohols with α,β-monoethylenically unsaturated carboxylic acids of 3 to 6 carbon atoms, such as hydroxyethyl, hydroxy-n-propyl or hydroxy-n-butyl acrylate and methacrylate are also suitable for postcrosslinking Primary or secondary amino containing acrylates or methacrylates such as t-butyl amino ethyl methacrylate are also suitable.

Preparation of latex compositions is well known in the paint and coatings art. Any of the well known free-radical emulsion polymerization techniques used to formulate latex polymers can be used in the present invention. Such procedures include, for example, single feed, core-shell, and inverted core-shell procedures which produce homogeneous or structured particles. In one embodiment of the present invention, one or both of the resins may comprise a single polymer formed from a mix of monomers as described herein. In another useful embodiment, one or both of the resins may comprise a combination of two polymers. Combinations of two polymers may be included in coating compositions as a blend of preformed (separately prepared) polymers, or as a sequentially-formed composition of the polymers, whereby one polymer has been prepared in the presence of another, preformed, polymer. As used herein "two-stage polymer" refers to an overall polymer where one polymer is formed in the presence of another, preformed, polymer. Without being limited to any particular theory, this polymerization process possibly, but not necessarily, results in the two polymers having a core/shell particle arrangement. In some two-stage polymers, the two polymer segments will have different Tgs. In such cases, one stage may be referred to as the hard segment (higher Tg), while the other stage is referred to as the soft segment (lower Tg). The term Tg means polymer glass transition temperature.

A crosslinker for reaction with the latent crosslinking functionality may be added to coating compositions of the present invention. The crosslinker need only be present in an amount necessary to achieve the desired degree of cure. For many applications, the crosslinker will typically be present at a level to provide at least 0.1 equivalent for each equivalent of latent crosslinking functionality.

In one of the embodiments of this invention, the crosslinker would be present at a level to provide between about 0.2 to about 2.0 equivalents for each equivalent of latent crosslinking functionality. In some useful embodiments the crosslinker will be present at a level to provide 0.4 to about 1.2 equivalents for each equivalent of latent crosslinking functionality. In another useful embodiment the crosslinker would be present at a level to provide about 0.4 to about 1.0 equivalent for each equivalent of latent crosslinking functionality.

Figure 2:
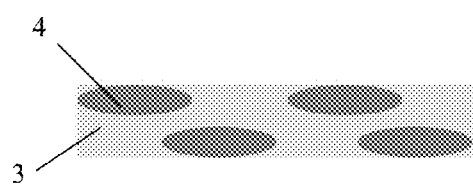
FIG. 2 illustrates a stratified coating having multiple layers.
Figure 3:
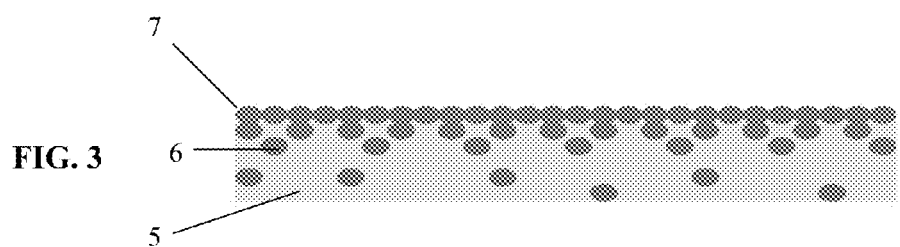
FIG. 3 illustrates a stratified coating having gradient layers.

While the polymers used in the base latex and the stratifying latex are formed from similar monomers as described above, the stratifying latex further comprises one or more "drivers" which serve to promote migration of the stratifying latex to the surface of the coating or to an interfacial layer within the coating composition during curing or drying. FIGS. 1-3 illustrate various types of potential coating stratification. FIG. 1 shows a base polymer 1 and a stratifying polymer 2 forming two discreet layers within a coating. FIG. 2 shows a base polymer 3 and a stratifying polymer 4 forming multiple layers within a coating. FIG. 3 illustrates a base polymer 5 and stratifying polymer 6, 7, forming a gradient of layers within the coating. The gradient of layers may be formed at the coating/air interface or form layers within the coating.

One such driver comprises including a low surface energy group in the polymer. The low surface energy group aids in creating surface energy differences between the base polymer and the stratifying polymer. The low surface energy group may also be used to create surface energy differences between the two stages in the two stage polymer. One type of low surface energy group comprises semi-flourinated groups. In one useful embodiment of the invention, a fluorinated monomer having the formula:

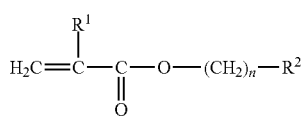

in which $R^1$ represents $CH_3$ or H; $R^2$ represents a perflourinated $C_1$-$C_{10}$ alkyl radical; and n≤4 is used in forming the stratifying polymer for use in the present invention. Examples of such monomers include, but are not limited to 2,2,2-trifluoroethyl acrylate, 2,2,2-trifluoroethyl methacrylate, 2,2,3,3-tetrafluoropropyl acrylate, 1H, 1H, 5H-octafluoropentyl acrylate, and 1H, 1H, 5H-octafluoropentyl methacrylate. In one useful embodiment, the low surface energy group allows a layer to form in the coating at an interface between two layers of coatings. In another useful embodiment, the low surface energy group may be an air-philic group, which aids the stratifying polymer in going to the surface of the coating that is exposed to the air.

In one useful embodiment, the stratifying polymer comprises about 2% to about 24%, for example, about 5% to about 12%, further for example, about 8%, by weight based on the total monomer weight, of a monomer containing an air-philic group, such as a fluorine containing monomer.

Another driver useful in the stratifying polymer of the present invention is the incorporation of a long chain acrylate monomer having an alkyl length of at least twelve, for example lauryl methacrylate. In one useful embodiment, the stratifying polymer comprises about 1% to about 5%, for example, about 2% to about 5%, by weight based on the total monomer weight, of a long chain acrylate monomer having an alkyl length of at least 12.

Another useful driver for the stratifying polymer is incorporating a wax as a seed in the formation of the stratifying polymer to form a wax composite latex. In such an embodiment, the wax would be part of the core of a two-stage polymer. In such an embodiment, the wax could be used as an encapsulation seed in the polymerization process. Such a process would use a wax particle as a seed and the polymer formed in the presence of the wax seed would encapsulate the wax particle. In one embodiment, the waxes used are nano wax particles having a diameter of about 100 nm or less and which are dispersed in water. Other useful wax particles are those having a melting point of about 160° or lower. Waxes which can be utilized in the practice of this invention can be any natural or synthetic wax such as bees wax, carnauba, paraffin, chlorinated naphthalenes, polyolefins, polyethylenes, and fluorinated and/or chlorinated polyolefines such as polytetrafluoroethylene (PTFE). Waxes useful in the present invention are commercially available. Various commercially available waxes may be useful in the present invention. For example, AQUACER™ or CERAFLOUR™ wax emulsions, such as AQUACER 531 or CERAFLOUR 913, available from BYK, may be used in the present invention. Other useful commercially available waxes are MICHEM™ waxes, available from Michelman.

In one useful embodiment of the present invention, the stratifying latex comprises a two-stage polymer where the lower Tg segment (the "softer" polymer) is the core in the core/shell particle arrangement while the higher Tg material (the "harder" polymer) is the shell. In another useful embodiment, one or more of the drivers described herein is contained in the softer core segment of such a polymer. In another embodiment, the hard shell segment is polymerized from a mix of monomers substantially or totally free of any stratification drivers, including fluorinated monomers or lauryl methacrylate. It should be understood that this is included by way of example only and is not intended to exclude the use of an opposite core/shell arrangement in the present invention or the inclusion of one or more drivers on either segment of the two-stage polymer. In one embodiment of the present invention, the soft segment has a Tg of about −35° C. to about 10° C. while the hard segment has a Tg from about 35° C. to about 100° C. Without being limited to any particular theory, it is believed that the soft-segment of the stratifying polymer is able to percolate to the surface of the coating.

In one embodiment of the present invention, the stratifying latex resin is formulated to have a small particle size, for example about 50 nm to about 150 nm, for example about 85 nm to about 135 nm, as measured by a Malvern Nano-s Zetasizer. In one such embodiment, the stratifying latex resin has a smaller particle size than the base latex. Without being bound by any particular theory, it is believed that the smaller particles may also facilitate stratification by being squeezed to the surface of the coating as the larger base latex particles cure.

The stratification drivers disclosed herein could each be used individually or could be used together in any combination to promote the formation of layers within the coating film.

To form a coating composition the base latex and the stratifying latex are combined. The base latex may be selected from any latexes capable of coalescence. Coalescence is the formation of a film by resin or polymer particles upon the evaporation of water or solvent from an emulsion or latex system, which permits contact and fusion of adjacent particles The coating composition may comprise about 2.5% to about 95% by weight, based on the total polymer solids, stratifying latex. For example, for some applications the coating composition may contain about 10% to about 25% by weight, based on the total polymer solids, stratifying latex. In other exemplary embodiments, the coating composition may contain about 25% to about 50%, for example about 30% to about 40% by weight, based on the total polymer solids, stratifying latex. In some embodiments, the components of the coating composition of the present invention separate during curing or drying to form layers of macroscopically measurable proportions. As such, the base latex and stratifying latex may be formulated to provide desired characteristics to each coating layer. For example, the latexes may be formulated to separate to provide the benefits of a base coat/clear coat system in a single coating composition. In order to achieve stratification, at least a portion of the base latex must have a higher surface tension than the stratifying latex.

In addition to the base latex and the stratifying latex resins, coating compositions in accordance with the present invention may also comprise various pigments, e.g. color pigments, corrosion inhibiting pigments, UV absorbers, hindered amine light stabilizers, plasticizers, rheology modifiers, specialty co-polymers, dispersants, surfactants, defoamers and other additives.

The following examples are presented to illustrate specific embodiments and practices of the present invention to allow a more complete understanding of the invention. Unless otherwise stated "parts" means parts-by-weight and "percent" is percent-by-weight. Unless otherwise noted, the polymers of Examples 1-8 may be prepared by the following procedure: the components of the Charge mixture are added to the reaction vessel under a nitrogen blanket. The polymerization reactions may be carried out at 80° C. to 85° C.±2° C., 0 to 10% of Pre-emulsion #1 may be added to the Charge mixture. Next the Seed Initiator may be added to the reaction vessel. Then, the rest of Pre-emulsion #1 and Initiator #1 may be added to the reaction vessel simultaneously over 1-3 hours. The reaction may then be held at about 80° C. to about 85° C. for about 30-60 minutes. For single stage latexes, the next step is cooling for the addition of the Chase Oxidizer and Chase Reducer. For two stage latexes, Pre-emulsion #2 and Initiator #2 may then be added to the reaction vessel simultaneously over 1-3 hours and reaction held at about 80° C. to about 85° C. for about 45 to about 120 minutes. For both single stage and two-stage latexes, the vessel may then be cooled to about 65° C. and the Chase Oxidizer and Chase Reducer may be added over about 30 minutes and then held for about 30-60 minutes at about 60-65° C. The vessel may be cooled to below about 40° C. and the Adjustment is added. The Charge Surfactant and PE Surfactant #1, in each case, is an anionic phosphate ester ethoxylated surfactant, which may be selected from TRYFAC™ surfactant from Cognis, RHODAFAC™, RS Series or RE Series, or SOPROPHOR™ surfactants from Rhodia, DEXTROL™ or STRODEX™ surfactants from Aqualon, T-MULZT™ surfactant from Harcros, or anionic sulfate esters ethoxylated surfactants selected from DISPONIL™ surfactant from Cognis, RHODAPEX™ or ABEX™ surfactants from Rhodia, or TDA or 23E sulfates from Sasol. PE Surfactant #2, in each case, is a reactive surfactant, which may be selected from SIPOMER™ PAM type surfactants from Rhodia or MAXEMUL™ surfactants from Croda. Buffer, in each case, may be selected from 26% aqueous ammonia solution, sodium carbonate, or sodium bicarbonate. Latent crosslinking monomer may be selected from acetoacetoxy methacrylate or diacetone acrylamide. The Crosslinker for diacetone acrylamide may be adipic dihydrazide. Defoamer, in each case, may be selected from Byk's defoamer line, Cognis' FOAMMASTER™ line, or Emerald Specialities FOAMBLAST™ line. Emulsified wax, in each case, is selected from AQUACER™ waxes from Byk or MICHEM™ waxes from Michelman.

EXAMPLE 1

A representative stratifying latex may be prepared as follows:

| Component | Parts by weight |
| --- | --- |
| Charge | |
| DI Water | 237.6 |
| Surfactant | 2.0 |
| Buffer | 0.2 |
| Pre-emulsion #1 | |
| DI Water | 160.7 |
| PE Surfactant #1 | 2.4 |
| PE Surfactant #2 | 3.0 |
| Buffer | 1.2 |
| Methacrylic Acid | 4.7 |
| 2-Ethyl Hexyl Acrylate | 137.0 |
| Methyl Methacrylate | 59.7 |
| 2,2,2 Trifluoroethyl Methacrylate | 34.0 |
| Lauryl Methacrylate | 11.1 |
| Latent crosslinking monomer | 8.1 |
| Seed Initiator | |
| DI Water | 3.9 |
| Ammonium Persulfate | 0.9 |
| Initiator #1 | |
| DI Water | 39.2 |
| Ammonium Persulfate | 0.7 |
| Pre-emulsion #2 | |
| DI Water | 44.2 |
| PE Surfactant #1 | 1.7 |
| PE Surfactant #2 | 2.1 |
| Buffer | 0.8 |
| Methacrylic Acid | 3.3 |
| 2-Ethyl Hexyl Acrylate | 9.7 |
| Methyl Methacrylate | 151.0 |
| Latent crosslinking monomer | 5.5 |
| DI Water Line Rinse | 9.3 |
| Initiator #2 | |
| DI Water | 23.5 |
| Ammonium Persulfate | 0.4 |
| Chase Oxidizer | |
| DI water | 7.3 |
| t-Butyl Hydroperoxide | 0.7 |
| Chase Reducer | |
| DI water | 9.4 |
| Isoascorbic Acid | 0.4 |
| Buffer | 0.2 |
| Adjustment | |
| DI Water | 11.7 |
| Buffer | 5.3 |
| Biocide | 1.8 |
| Defoamer | 0.1 |
| Crosslinker | 5.1 |

A latex prepared according to the above could have a theoretical Tg of −13° C.(core)/88° C.(shell), a particle size of 107.1 nm, and a viscosity of 132.0 cps.

EXAMPLE 2

A second representative stratifying latex may be prepared as follows:

| Component | Parts by weight |
| --- | --- |
| Charge | |
| DI Water | 356.8 |
| Surfactant | 0.9 |
| Buffer | 0.2 |
| Pre-emulsion #1 | |
| DI Water | 149.0 |
| PE Surfactant #1 | 7.0 |
| PE Surfactant #2 | 6.9 |
| Buffer | 1.8 |
| Methacrylic Acid | 6.9 |
| 2-Ethyl Hexyl Acrylate | 158.4 |
| Methyl Methacrylate | 43.2 |
| Styrene | 180.6 |
| 2,2,2 Trifluoroethyl Methacrylate | 16.3 |
| Seed Initiator | |
| DI Water | 2.8 |
| Ammonium Persulfate | 0.8 |
| Initiator #1 | |
| DI Water | 42.4 |
| Ammonium Persulfate | 0.9 |
| Chase Oxidizer | |
| DI water | 8.5 |
| t-Butyl Hydroperoxide | 0.4 |
| Chase Reducer | |
| DI water | 8.5 |
| Isoascorbic Acid | 0.3 |
| Buffer | 0.1 |

-continued

| Component | Parts by weight |
|---|---|
| Adjustment | |
| Buffer | 5.3 |
| Biocide | 2.0 |

A latex prepared according to the above could have a theoretical Tg of 20° C., a particle size of 95.6 nm, and a viscosity of 96.0 cps.

EXAMPLE 3

A third representative stratifying latex may be prepared as follows:

| Component | Parts by weight |
|---|---|
| Charge | |
| DI Water | 237.8 |
| Surfactant | 2 |
| Buffer | 0.2 |
| Pre-emulsion #1 | |
| DI Water | 160.7 |
| PE Surfactant #1 | 2.4 |
| PE Surfactant #2 | 3.0 |
| Buffer | 1.2 |
| Methacrylic Acid | 4.7 |
| 2-Ethyl Hexyl Acrylate | 140.0 |
| Methyl Methacrylate | 90.6 |
| Lauryl Methacrylate | 11.1 |
| Latent crosslinking monomer | 8.1 |
| Seed Initiator | |
| DI Water | 3.9 |
| Ammonium Persulfate | 0.9 |
| Initiator #1 | |
| DI Water | 39.2 |
| Ammonium Persulfate | 0.7 |
| Pre-emulsion #2 | |
| DI Water | 44.2 |
| PE Surfactant #1 | 1.7 |
| PE Surfactant #2 | 2.1 |
| Buffer | 0.8 |
| Methacrylic Acid | 3.3 |
| 2-Ethyl Hexyl Acrylate | 9.7 |
| Methyl Methacrylate | 151 |
| Latent crosslinking monomer | 5.5 |
| DI Water Line Rinse | 9.3 |
| Initiator #2 | |
| DI Water | 23.5 |
| Ammonium Persulfate | 0.4 |
| Chase Oxidizer | |
| DI water | 7.3 |
| t-Butyl Hydroperoxide | 0.7 |
| Chase Reducer | |
| DI water | 9.4 |
| Isoascorbic Acid | 0.4 |
| Buffer | 0.2 |
| Adjustment | |
| DI Water | 11.7 |
| Buffer | 5.3 |
| Biocide | 1.8 |
| Defoamer | 0.1 |
| Crosslinker | 5.1 |

A latex prepared according to the above could have a theoretical Tg of −12° C.(core)/88° C.(shell), a particle size of 97.3 nm, and a viscosity of 36.0 cps.

EXAMPLE 4

A fourth representative stratifying latex may be prepared as follows:

| Component | Parts by weight |
|---|---|
| Charge | |
| DI Water | 294.1 |
| Surfactant | 5.9 |
| Buffer | 0.6 |
| Pre-emulsion #1 | |
| DI Water | 91.3 |
| PE Surfactant #1 | 5.9 |
| PE Surfactant #2 | 2.6 |
| Buffer | 1.0 |
| Methacrylic Acid | 4.0 |
| 2-Ethyl Hexyl Acrylate | 125.6 |
| Methyl Methacrylate | 80.7 |
| Latent crosslinking monomer | 6.9 |
| Seed Initiator | |
| DI Water | 3.9 |
| Ammonium Persulfate | 0.9 |
| Initiator #1 | |
| DI Water | 23.7 |
| Ammonium Persulfate | 0.5 |
| Pre-emulsion #2 | |
| DI Water | 62.0 |
| PE Surfactant #1 | 5.9 |
| PE Surfactant #2 | 2.6 |
| Buffer | 1.0 |
| Methacrylic Acid | 4.0 |
| 2-Ethyl Hexyl Acrylate | 5.7 |
| Methyl Methacrylate | 140.8 |
| 2,2,2 Trifluoroethyl Methacrylate | 51.5 |
| Latent crosslinking monomer | 6.9 |
| DI Water Line Rinse | 5.8 |
| Initiator #2 | |
| DI Water | 23.6 |
| Ammonium Persulfate | 0.5 |
| Chase Oxidizer | |
| DI water | 7.3 |
| t-Butyl Hydroperoxide | 0.7 |
| Chase Reducer | |
| DI water | 9.4 |
| Isoascorbic Acid | 0.4 |
| Buffer | 0.2 |
| Adjustment | |
| DI Water | 11.8 |
| Buffer | 5.3 |
| Biocide | 1.8 |
| Crosslinker | 5.2 |

A latex prepared according to the above could have a theoretical Tg of −10° C.(core)/90° C.(shell), a particle size of 87.2 nm, and a viscosity of 208.0 cps.

EXAMPLE 5

A fifth representative stratifying latex may be prepared as follows:

| Component | Parts by weight |
|---|---|
| Charge | |
| DI Water | 259.2 |
| Surfactant | 2 |
| Emulsified Wax | 49 |
| Buffer | 0.2 |
| Pre-emulsion #1 | |
| DI Water | 54.8 |
| PE Surfactant #1 | 2.4 |
| PE Surfactant #2 | 3.0 |
| Buffer | 1.2 |
| Methacrylic Acid | 4.7 |
| 2-Ethyl Hexyl Acrylate | 145.7 |
| Methyl Methacrylate | 42.9 |
| 2,2,2 Trifluoroethyl Methacrylate | 50.7 |
| Latent crosslinking monomer | 8.0 |
| Seed Initiator | |
| DI Water | 3.9 |
| Ammonium Persulfate | 0.9 |
| Initiator #1 | |
| DI Water | 23.2 |
| Ammonium Persulfate | 0.5 |
| Pre-emulsion #2 | |
| DI Water | 101.0 |
| PE Surfactant #1 | 1.6 |
| PE Surfactant #2 | 2.1 |
| Buffer | 0.8 |
| Methacrylic Acid | 3.2 |
| 2-Ethyl Hexyl Acrylate | 4.6 |
| Latent crosslinking monomer | 154.6 |
| Latent crosslinking monomer | 5.6 |
| DI Water Line Rinse | 9.0 |
| Initiator #2 | |
| DI Water | 23.3 |
| Ammonium Persulfate | 0.4 |
| Chase Oxidizer | |
| DI water | 5.4 |
| t-Butyl Hydroperoxide | 0.6 |
| Chase Reducer | |
| DI water | 9.3 |
| Isoascorbic Acid | 0.5 |
| Buffer | 0.2 |
| Adjustment | |
| DI Water | 13.5 |
| Buffer | 5.2 |
| Biocide | 1.7 |
| Crosslinker | 5.1 |

A latex prepared according to the above could have a theoretical Tg of −13° C.(core)/96° C.(shell), a particle size of 117.0 nm, and a viscosity of 88.0 cps.

EXAMPLE 6

A sixth representative stratifying latex may be prepared as follows:

| Component | Parts by weight |
|---|---|
| Charge | |
| DI Water | 263.1 |
| Surfactant | 2.1 |
| Emulsified Wax | 50 |
| Buffer | 0.2 |
| Pre-emulsion #1 | |
| DI Water | 55.6 |
| PE Surfactant #1 | 2.4 |
| PE Surfactant #2 | 3.0 |
| Buffer | 1.2 |
| Methacrylic Acid | 4.7 |
| 2-Ethyl Hexyl Acrylate | 156.1 |
| Methyl Methacrylate | 98.0 |
| Seed Initiator | |
| DI Water | 3.9 |
| Ammonium Persulfate | 0.9 |
| Initiator #1 | |
| DI Water | 23.5 |
| Ammonium Persulfate | 0.5 |
| Pre-emulsion #2 | |
| DI Water | 111.2 |
| PE Surfactant #1 | 1.7 |
| PE Surfactant #2 | 2.1 |
| Buffer | 0.8 |
| Methacrylic Acid | 3.4 |
| 2-Ethyl Hexyl Acrylate | 4.7 |
| Methyl Methacrylate | 161.6 |
| Initiator #2 | |
| DI Water | 23.6 |
| Ammonium Persulfate | 0.4 |
| Chase Oxidizer | |
| DI water | 7.5 |
| t-Butyl Hydroperoxide | 0.6 |
| Chase Reducer | |
| DI water | 9.5 |
| Isoascorbic Acid | 0.5 |
| Buffer | 0.2 |
| Adjustment | |
| Buffer | 5.3 |
| Biocide | 1.7 |

A latex prepared according to the above could have a theoretical Tg of −13° C.(core)/97° C.(shell), a particle size of 117.5 nm, and a viscosity of 40.0 cps.

EXAMPLE 7

A seventh representative stratifying latex may be prepared as follows:

| Component | Parts by weight |
|---|---|
| Charge | |
| DI Water | 208.3 |
| Surfactant | 3.8 |
| Buffer | 0.4 |
| Pre-emulsion #1 | |
| DI Water | 226.5 |
| PE Surfactant #1 | 4.4 |
| PE Surfactant #2 | 5.5 |
| Buffer | 2.3 |
| Methacrylic Acid | 8.7 |
| 2-Ethyl Hexyl Acrylate | 252.7 |
| Methyl Methacrylate | 161.3 |
| Seed Initiator | |
| DI Water | 7.2 |
| Ammonium Persulfate | 1.7 |

| Component | Parts by weight |
|---|---|
| Initiator #1 | |
| DI Water | 72.34 |
| Ammonium Persulfate | 1.2 |
| Chase Oxidizer | |
| DI water | 10.8 |
| t-Butyl Hydroperoxide | 1.2 |
| Chase Reducer | |
| DI water | 17.3 |
| Isoascorbic Acid | 0.9 |
| Buffer | 0.4 |
| Adjustment | |
| Buffer | 9.8 |
| Biocide | 3.2 |
| Defoamer | 0.1 |

A latex prepared according to the above could have a theoretical Tg of −12° C. and a particle size of 80.5.1 nm.

EXAMPLE 8

A representative single stage base latex may be prepared as follows:

| Component | Parts by weight |
|---|---|
| Charge | |
| DI Water | 359 |
| Surfactant | 0.8 |
| Ammonium Persulfate | 0.8 |
| Buffer | 0.3 |
| Pre-emulsion #1 | |
| DI Water | 148.9 |
| PE Surfactant #1 | 7 |
| PE Surfactant #2 | 7.2 |
| Buffer | 2 |
| Methacrylic Acid | 7.2 |
| 2-Ethyl Hexyl Acrylate | 164.7 |
| Methyl Methacrylate | 28.4 |
| Styrene | 187.8 |
| Wet adhesion monomer | 16.5 |
| Initiator #1 | |
| DI Water | 42.3 |
| Ammonium Persulfate | 0.8 |
| Chase Oxidizer | |
| DI water | 8.5 |
| t-Butyl Hydroperoxide | 0.6 |
| Chase Reducer | |
| DI water | 8.5 |
| Isoascorbic Acid | 0.4 |
| Buffer | 0.2 |
| Adjustment | |
| DI Water | 1.3 |
| Buffer | 5.3 |
| Biocide | 2 |

The resulting latex has a theoretical Tg of 16° C.

EXAMPLE 9

An exemplary paint composition may be made by mixing the following

| Material | Parts by weight |
|---|---|
| Grind | |
| Water | 13.52 |
| Aqueous ammonia | 0.32 |
| Rheology modifier[1] | 1.26 |
| Dispersant[2] | 0.65 |
| Surfactant[3] | 0.29 |
| Dispersant[4] | 0.31 |
| Titanium dioxide[5] | 14.79 |
| Let Down | |
| Stratifying latex of Example 1 or 5 or 6 | 16.27 |
| Base latex of Example 8 | 48.81 |
| Propylene glycol | 1.80 |
| Glycol ether DPnB | 0.74 |
| Propylene glycol phenyl ether | 0.43 |
| Plasticizer[6] | 0.42 |
| Rheology modifier[7] | 0.39 |

[1] Acrysol RM2020 rheology modifier from Dow.
[2] TAMOL 165-A dispersant from Dow.
[3] TRITON CF-10 surfactant from Dow.
[4] BYK 024 dispersant from Byk.
[5] R-706 TiO$_2$ from DuPont.
[6] BenzoFlex B50 plasticizer from Genovique Specialities.
[7] Acrysol RM825 rheology modifier from Dow.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. An aqueous coating composition comprising:
   (1) a base latex resin; and
   (2) a stratifying latex resin having latent crosslinking functionality, the stratifying latex comprising the polymerization reaction product of at least one or more copolymerizable monoethylenically unsaturated monomers, wherein the monoethylenically unsaturated monomers comprise (a) at least one fluorine containing monomer and (b) at least one monomer having latent crosslinking functionality, wherein the stratifying latex resin is a two-stage polymer formed by sequentially polymerizing a first group of monomers to form a core and a second group of monomers to form a shell, and wherein the core has a Tg from about −20° C. to about 10° C. and comprises the polymerization reaction product of a fluorine containing monomer, a monomer having latent crosslinking functionality; and a long chain acrylate monomer having an alkyl length of at least 12, and wherein the shell has a Tg from about 35° C. to about 100° C. and comprises the polymerization reaction product of one or more copolymerizable monoethylenically unsaturated monomers excluding fluorine containing monomers.

2. The aqueous coating composition of claim 1, wherein the coating composition comprises about 2.5% to about 95% by weight stratifying latex resin, based on the total polymer solids weight.

3. The aqueous coating composition of claim 1, wherein the coating composition comprises about 25% to about 50% by weight stratifying latex resin, based on the total polymer solids weight.

4. The aqueous coating composition of claim 1, wherein the coating composition comprises about 30% to about 40% by weight stratifying latex resin, based on the total polymer solids weight.

5. The aqueous coating composition of claim 1, wherein the at least one fluorine containing monomer has the formula:

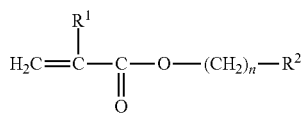

in which $R^1$ represents $CH_3$ or H; $R^2$ represents a perflourinated $C_1$-$C_{10}$ alkyl radical; and $n \leq 4$.

6. The aqueous coating composition of claim 1, wherein the latent crosslinking functionality comprises carbonyl groups.

7. The aqueous coating composition of claim 1, wherein the core comprises the polymerization reaction product of:
  (a) about 2% to about 12% by weight based on the total monomer weight of the fluorine containing monomer;
  (b) about 2 to about 6% by weight based on the total monomer weight of the monomer having latent crosslinking functionality; and
  (c) about 1 to about 5% by weight based on the total monomer weight of the long chain acrylate monomer having an alkyl length of at least 12.

8. The aqueous coating composition of claim 1, wherein the shell comprises the polymerization reaction product of one or more copolymerizable monoethylenically unsaturated monomers excluding long chain acrylate monomers having an alkyl length of at least 12.

9. The aqueous coating composition of claim 1, wherein the at least one monomer having latent crosslinking functionality is selected from acrolein, methacrolein, diacetone acrylamide, diacetone methacrylamide, 2 butanone methacrylate, formyl styrol, diacetone acrylate, diacetone methacrylate, acetonitrile acrylate, acetoacetoxyethyl methacrylate, acetoacetoxyethyl acrylate, and vinylaceto acetate.

10. The aqueous coating composition of claim 9 further comprising:
  an effective crosslinking amount of a crosslinking agent for the stratifying polymer.

11. The aqueous coating composition of claim 10, wherein the crosslinking agent is selected from di and poly amines, di and poly hydrazides, and di and poly hydrazines, and mixtures thereof.

12. The aqueous coating composition of claim 1, wherein the at least one monomer having latent crosslinking functionality is selected from methacryloyloxypropyltrimethoxysilane, methacryloyloxypropyltriethoxysilane methacryloyloxypropyltripropoxysilane, vinyitrimethoxysilane, vinyltriethoxysilane, vinylisopropoxysilane, gamma-amino triethoxy silane, cycloaliphatic epoxide trimethoxy silane, and gamma-methacryloxy propyl trimethoxy silane.

13. The aqueous coating composition of claim 12, wherein the coating composition comprises titanium dioxide.

14. The aqueous coating composition of claim 1, wherein the stratifying latex resin has an average particle size of about 50 nm to about 150 nm.

15. The aqueous coating composition of claim 14, wherein the stratifying latex resin has an average particle size of about 85 mn to about 135 nm.

\* \* \* \* \*

UNITED STATES PATENT AND TRADEMARK OFFICE
CERTIFICATE OF CORRECTION

| | | |
|---|---|---|
| PATENT NO. | : 9,000,069 B1 | Page 1 of 1 |
| APPLICATION NO. | : 13/175083 | |
| DATED | : April 7, 2015 | |
| INVENTOR(S) | : Peter J. Mackulin et al. | |

It is certified that error appears in the above-identified patent and that said Letters Patent is hereby corrected as shown below:

In the Specification

Column 5, Line 8 and Line 9, delete "perflourinated", and insert --perfluorinated--.

In the Claims

Column 15, Line 19 and Line 20, delete "perflourinated", and insert --perfluorinated--.

Column 16, Line 23, delete "vinyitrimethoxysilane", and insert --vinyltrimethoxysilane--.

Column 16, Line 33, delete "85mn", and insert --85nm--.

Signed and Sealed this
Tenth Day of November, 2015

Michelle K. Lee
*Director of the United States Patent and Trademark Office*